United States Patent [19]
Seyfang

[11] Patent Number: 5,848,768
[45] Date of Patent: Dec. 15, 1998

[54] LAMINAR FLOW SKIN

[75] Inventor: George R. Seyfang, Preston, Great Britain

[73] Assignee: British Aerospace plc, Great Britain

[21] Appl. No.: 756,934

[22] Filed: Dec. 2, 1996

Related U.S. Application Data

[63] Continuation of Ser. No. 431,071, Apr. 27, 1995, abandoned.

[30] Foreign Application Priority Data

Apr. 28, 1994 [GB] United Kingdom .................... 9408451

[51] Int. Cl.⁶ .................................................. B64C 23/00
[52] U.S. Cl. ......................................................... 244/198
[58] Field of Search .................................. 244/130, 198, 244/200, 204, 207, 208, 209

[56] References Cited

U.S. PATENT DOCUMENTS

| | | | |
|---|---|---|---|
| 2,821,351 | 1/1958 | Utgoff | 244/208 |
| 2,841,344 | 7/1958 | Stroufoff | 244/208 |
| 3,097,817 | 7/1963 | Towzey | 244/209 |
| 3,309,042 | 3/1967 | Edwards | 244/209 |
| 3,952,823 | 4/1976 | Hinderks | 244/208 |
| 4,664,345 | 5/1987 | Lurz | 244/208 |
| 4,671,474 | 6/1987 | Haslund . | |

FOREIGN PATENT DOCUMENTS

| | | |
|---|---|---|
| 094217 | 11/1983 | European Pat. Off. . |
| 558904 | 9/1993 | European Pat. Off. . |
| 564662 | 10/1993 | European Pat. Off. . |
| 1273338 | 4/1969 | Germany . |
| 2150256 | 6/1985 | United Kingdom . |

OTHER PUBLICATIONS

"Making Large Suction Panels for Laminar–Flow Control", NTIS Tech Notes, May 1993, p. 396.

*Primary Examiner*—Galen L. Barefoot
*Attorney, Agent, or Firm*—Cushman Darby & Cushman Intellectual Property Group of Pillsbury Madison & Sutro, LLP

[57] ABSTRACT

Apparatus for the control of boundary layer fluids by a suction technique, the said apparatus being adapted to form part of or attach to a fluid dynamic surface and comprising; a sandwich skin material consisting of at least two layers, an outer layer of which is in use positioned adjacent to the boundary layer fluid, the said layers of material bounding internal intercommunicating passageways to allow in use the movement of fluid to substantially all areas within the material, the outer layer being provided with a plurality of holes communicating with the internal passageways of the said sandwich skin material and a plurality of hoods or steps being fixedly attached to the outer layer of the material located such that in use said hoods or steps are downstream of said plurality of holes and each upstream of and shielding an opening in said outer layer and communicating with at least one of said internal intercommunicating passageways.

2 Claims, 1 Drawing Sheet

LAMINAR FLOW SKIN

This is a continuation of application Ser. No. 08/431,071, filed on Apr. 27, 1995, which was abandoned upon the filing hereof.

This invention relates to the field of fluid dynamics with particular reference to apparatus and methods for the control of boundary layers present on the aerodynamic surfaces of aircraft.

It will be appreciated by those skilled in the art of fluid dynamics that problems and their solutions relating to aerodynamics are encountered in a similar way in hydrodynamics, and whilst we have described our invention in this document with reference to aerodynamics it is equally applicable to the solution of similar problems in the hydrodynamics field.

It is known that the aerodynamic surfaces of an aircraft operate more efficiently in producing lift if the air flowing over such surfaces closely follows their shape. One of the factors acting to reduce this aerodynamic efficiency and contributing substantially to the overall drag of the aircraft is the thin layer of relatively stationary air, known as the boundary layer, immediately adjacent to the outer surface of an aircraft in flight. Due to the viscosity of the air contained within in the boundary layer, the kinetic energy of the airflow over the aircraft within this boundary layer reduces substantially as it approaches the aircraft skin, thus causing viscous drag.

The main body of airflow over the aircraft is affected by the presence of the boundary layer such that at certain combinations of angle of attack and airspeed the boundary layer and associated main stream of airflow may separate from the aircraft skin resulting in reduced lift, increased drag and more importantly an increase in the aerodynamic stall speed of the aircraft.

To ensure against these unwanted aerodynamic characteristics various solutions have been proposed to reduce the effects of the boundary layer by suction techniques thus increasing the kinetic energy of the airflow adjacent to the aircraft skin.

One prior art method for the control of boundary layers via suction techniques is described in German Patent No. 1,273,338. The method disclosed comprises the removal of the boundary layer by suction through air bleed orifices positioned on the aerodynamic surface of the aircraft skin. This method is highly energy consuming since a mechanical suction device is required to generate the necessary forces.

More advanced methods for the control of boundary layers have been proposed wherein the boundary layer is removed by suction created by special chambers positioned in the trailing aerodynamic surfaces whereby vortices are created within the said chambers producing the differential pressures required to enable the boundary layer to be sucked into special wing cavities. Prior art documents detailing this method of boundary layer control include U.S. Pat. No. 4,671,474 and European Patent Application No. 92922809.6.

Within this field of research, the need to generate the required suction for efficient boundary layer control has so far required either additional power sources or substantial structural modifications to skins and lifting surfaces of the aircraft to which they are to be applied.

It is an object of the present invention to provide a simple and effective means to achieve efficient boundary layer control without the requirement for moving parts or significant aerofoil shape changes.

Our invention comprises apparatus for the control of boundary layer fluid by a suction technique, the said apparatus being adapted to form part of or attach to a fluid dynamic surface and comprising; a sandwich skin material of at least two layers an outer layer of which is in use positioned adjacent to the boundary layer fluid, the said layers of material bounding internal intercommunicating passageways to allow in use the movement of fluid to substantially all areas within the material, the outer layer being provided with a plurality of holes communicating with the internal passageways of the said sandwich skin material and a plurality of hoods or steps being fixedly attached to the outer skin layer of the material, located such that in use said hoods or steps are downstream of said plurality of holes and each upstream of and shielding an opening in said outer layer communicating with at least one of said internal intercommunicating passageways.

These and other objects and advantages of the invention will be now be described by way of a non-limiting example in which.

Figure 1:
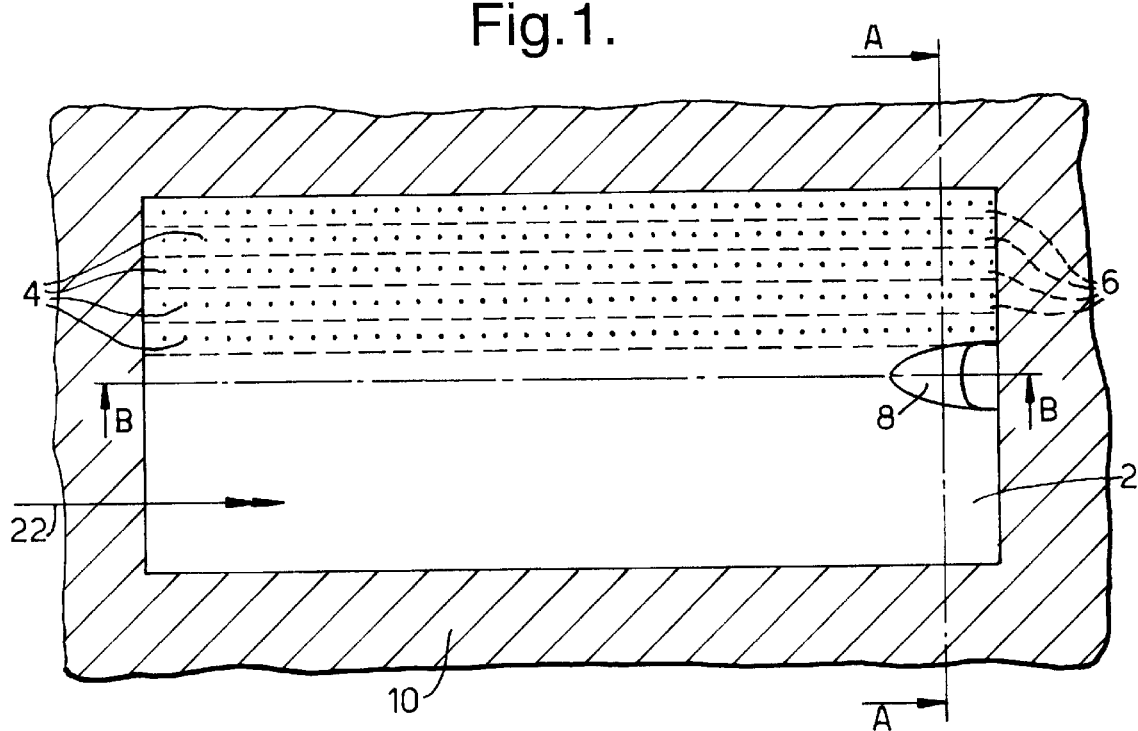
FIG. 1 is a plan view of a laminar flow skin panel in accordance with the invention.

FIG. 1 shows a section of a laminar flow skin panel 2 positioned on the outer surface of an aircraft wing skin 10 so as, in use, to be exposed to airflow over the wing, indicated by the arrow 22. Panel 2 has a plurality of holes 4 drilled through the upper surface 16. A suction hood 8 is shown positioned downstream of the multiple holes 4.

Figure 2:
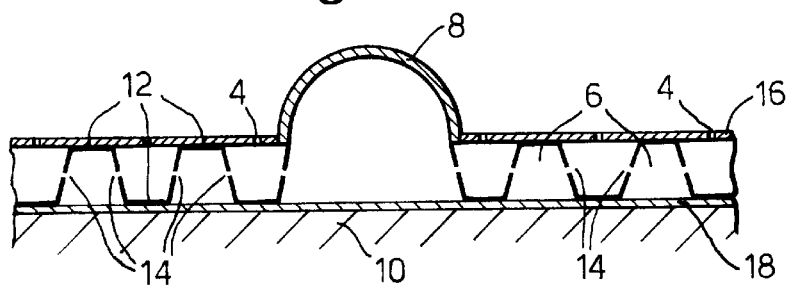
FIG. 2 is a sectional view along line A—A of FIG. 1.

FIG. 2 shows a lower layer 18 of the laminar flow skin panel 2 of FIG. 1 fixedly attached to the aircraft skin 10. The lower skin 18 and an upper layer 16 of the panel 2 maintained at a fixed distance apart by structural spacers 12 to form a sandwich like structure. The upper and lower layers, 16 and 18, and the spacers 12 thus form a series of longitudinal ducts 6 into which boundary layer fluid may in use be drawn through the holes 4.

Figure 3:
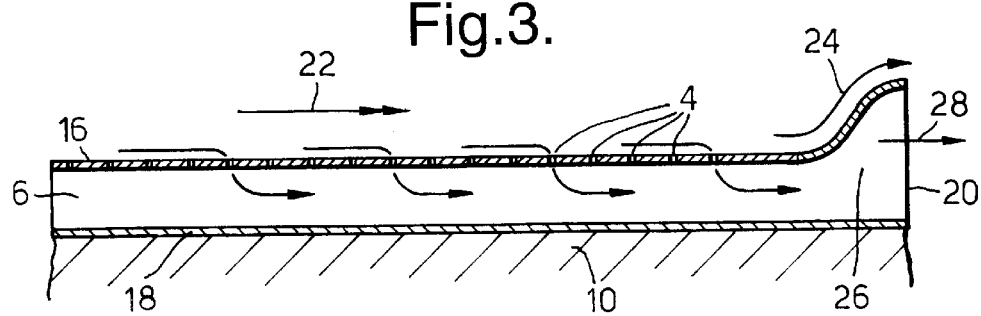
FIG. 3 is a sectional view along the line B—B of FIG. 1.

The suction hood 8 is positioned such that an open throat area 20 of the hood faces downstream of the normal external flow 22, in the direction of arrow 28 (see FIG. 3).

The walls of the longitudinally aligned spacers 12 have a plurality of holes 14 spaced along their longitudinal length to enable the boundary layer fluid to effectively communicate between each duct 6 and ultimately with the throat area of the suction hood 8 (see FIG. 3).

In use a plurality of laminar flow skin panels 2 are fixedly attached to the aircraft skin 10 and positioned in areas where boundary layer suction and the resultant lowering in viscous drag would ultimately improve the aerodynamic characteristics of the aircraft.

When air flows across the laminar flow skin panels in the direction indicated by arrow 22, it reaches the position of the suction hood 8 and is forced to change direction and is thus accelerated over the hood as indicated by arrow 24 in FIG. 3 causing a local reduction in fluid pressure. The resultant differential pressure between the exterior of the hood 8 at 24, and the interior at a point 26 causes a suction in the direction 28 and thus lowers the internal pressure of the longitudinally aligned ducts 6. This reduction in pressure within the ducts 6 causes the external flow boundary layer air upstream of the hoods 8 to be sucked in through the plurality of holes 4 present in the top surface of the skin panel 2 thus substantially removing the boundary layer element from the external airflow.

The applications of this invention are not limited purely to the aerospace field, but similar drag and efficiency changes may be effected in automotive vehicles, ships, submarine hulls and the inside of fluid transfer pipelines.

I claim:

1. Apparatus for the control of boundary layer fluids by a suction technique, the said apparatus being adapted to form part of or attach to a fluid dynamic surface and comprising; a sandwich skin material consisting of at least two layers, an outer layer of which is in use positioned adjacent to the boundary layer fluid, the said layers of material bounding internal intercommunicating passageways to allow in use the movement of fluid to substantially all areas within the material, the outer layer being provided with a plurality of holes communicating with the internal passageways of the said sandwich skin material and a plurality of hoods or steps being fixedly attached to the outer layer of the material located such that in use said hoods or steps are downstream of said plurality of holes and each upstream of and shielding an opening in said outer layer and communicating with at least one of said internal intercommunicating passageways.

2. Apparatus for controlling boundary layer fluid and adapted to form part of or be attached to a fluid dynamic surface, said apparatus comprising:

a sandwich skin structure comprising at least first and second layers, an outer layer of which is in use disposed adjacent to the boundary layer fluid, each said layer being formed as a generally flat plate component;

a plurality of internal, intercommunicating passageways being defined between said two layers, said passageways extending substantially in parallel to a plane of at least one of said layers;

a plurality of holes being defined in said outer layer, a plurality of said holes being in communication with each said internal passageway;

at least one of said internal intercommunicating passageways having a downstream outlet opening; and a plurality of hood structures each fixedly attached to or defined in a downstream portion of the outer layer so as to be downstream of said plurality of holes and upstream of and shielding said downstream outlet opening of said at least one of said internal intercommunicating passageways.

* * * * *